United States Patent [19]

Frank et al.

[11] 4,119,979
[45] Oct. 10, 1978

[54] TIMED PIEZOELECTRIC SHUTTER CONTROL FOR CAMERAS

[75] Inventors: Lee Fitzpatrick Frank; James Kelly Lee, both of Rochester, N.Y.

[73] Assignee: Eastman Kodak Company, Rochester, N.Y.

[21] Appl. No.: 816,835

[22] Filed: Jul. 18, 1977

[51] Int. Cl.² .................. G03B 7/08; H01V 41/10
[52] U.S. Cl. ............................. 354/50; 354/234; 310/332; 310/339
[58] Field of Search ............ 354/50, 60 R, 142, 234, 354/271, 135, 51; 350/161 R, 269; 310/331, 332, 339

[56] References Cited

U.S. PATENT DOCUMENTS

| | | | |
|---|---|---|---|
| 3,110,824 | 11/1963 | Flanagan | 354/271 X |
| 3,500,451 | 3/1970 | Yando | 354/135 X |
| 3,636,840 | 1/1972 | Harvey et al. | 354/29 |

*Primary Examiner*—Michael L. Gellner
*Attorney, Agent, or Firm*—Warren W. Kurz

[57] ABSTRACT

A camera is disclosed which includes a shutter latchable in an open position to permit scene light to pass through a camera aperture, an electronic circuit for producing a sudden change in voltage after an exposure period determined by the level of scene luminance, and a piezoelectric energy conversion device, such as a bimorph, which is responsive to such voltage change to rapidly change shape and thereby unlatch the shutter and allow it to move toward a closed position.

10 Claims, 6 Drawing Figures

TIMED PIEZOELECTRIC SHUTTER CONTROL FOR CAMERAS

CROSS-REFERENCE TO RELATED APPLICATIONS

Reference is made to our commonly assigned, co-pending U.S. Pat. applications Ser. No. 816,776, entitled PIEZOELECTRIC CAMERA SHUTTER, filed on July 18, 1977; and Ser. No. 816,834, entitled PIEZOELECTRIC ELECTRONIC SHUTTER CONTROL FOR CAMERAS, filed on July 18, 1977.

BACKGROUND OF THE INVENTION

1. Field of the Invention

The present invention relates to exposure control devices for use in still cameras and the like, and more particularly to shutter control devices for automatically establishing exposure time in accordance with the level of scene illumination.

2. Description of the Prior Art

In many prior art shutter control devices which include timing circuits for establishing shutter speed, the circuit is energized by a battery contained in the camera. Such mechanisms usually include an electromagnetic transducer adapted to close the shutter after a period of time determined by the timing circuit. Although such arrangements are generally satisfactory, they rely on the availability of sufficient power from the battery. When the battery power is inadequate for operation of such systems, either the shutter operates at a fixed, predetermined speed or it remains open indefinitely, depending on the type of shutter control.

In our commonly assigned, co-pending U.S. Patent application Ser. No. 816,776, entitled PIEZOELECTRIC CAMERA SHUTTER, filed on July 18, 1977, a shutter control device was disclosed which employed a piezoelectric bimorph for providing electrical energy for powering an electronic exposure control circuit.

The shutter control device disclosed in that application represented a significant improvement over previously known mechanisms because piezoelectric devices are more reliable than battery sources and more efficient than conventional, non-battery powered sources known in the prior art for powering camera exposure control systems.

In that application, as well as in our commonly assigned, co-pending U.S. Patent application Ser. No. 816,834, entitled PIEZOELECTRIC ELECTRONIC SHUTTER CONTROL FOR CAMERAS filed on July 18, 1977, mechanical actuation of the shutter to terminate an exposure is effected by means of a piezoelectric motor which gradually changes shape as the electric field applied to the piezoelectric motor changes in accordance with the amount of light received by the film during the exposure. When a predetermined shape is attained by the piezoelectric motor, the shutter closes to terminate exposure. Since the shutter closing mechanism is dependent upon the position and shape of the piezoelectric motor, the location of the motor relative to the other related camera elements is critical to obtaining an accurate exposure time. Accordingly, extreme care must be taken during manufacture to insure that the piezoelectric motor is accurately positioned in the camera. Further in the latter two above-mentioned applications, there is an extent of rubbing between relatively moving parts during the shutter closing sequence. The amount of friction must be compensated for in positioning the piezoelectric motor during manufacture. Should wear during the camera's life change the amount of friction, the shutter timing might be affected.

By the present invention, a piezoelectric motor is arranged to supply mechanical energy to unlatch a camera's shutter in a manner in which the exact position of the motor is not as critical as in the prior art, and which thereby permits greater manufacturing tolerances during assembly and a reduced sensitivity to friction and wear during the camera's life.

SUMMARY OF THE INVENTION

In accordance with the present invention, there is provided a camera having a shutter which latches in an open position during an exposure and which is unlatched in response to a sudden change in shape of a piezoelectric motor such as a bimorph. The sudden change in shape of the motor is caused by sudden change in an electrical signal applied to the motor when the exposure time is complete.

In a preferred embodiment of the present invention, a piezoelectric bimorph motor carries a latch which holds a camera's shutter closing blade in an open position. Sudden application of an electrical charge to the motor bimorph causes the bimorph to flex rapidly and "fling" the latch open to release the closing blade so that the shutter closes. Because the latch release is by this "flinging" movement rather than by the bimorph assuming any predetermined shape, accurate timed release of the closing blade is realized without the careful alignment of the bimorph motor relative to other camera elements.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings in which.

DESCRIPTION OF THE PREFERRED EMBODIMENT

Piezoelectricity is a well known phenomenon exhibited by certain crystals. In brief, when such crystals are compressed or extended in particular directions, electric charges of opposite signs are produced at opposite ends of the crystal. Not only is an electric moment induced in piezoelectric crystals by an application of mechanical stress or strain, there is also a converse effect; namely, on applying an electric field, the crystal changes shape by expansion in one direction and contraction in another. A fuller discussion of the direct and converse effects may be found in ENCYCLOPAEDIC DICTIONARY OF PHYSICS, Pergamon Press, 1962, pages 503–505.

A bimorph, or bimorph cell, is a member composed of two strips of piezoelectric material joined together (such as by cement) with the direction of expansion of one strip aligned with the direction of contraction of the other such that the application of an electric potential to both strips causes one to expand and the other to contract, thus producing a bending of the combination. Until the potential difference is removed, the bimorph will remain bent. If a bimorph is physically bent, an electric potential difference tending to return the bimorph to its original configuration will develop from one strip to the other strip. That potential difference will remain until externally removed or the bimorph is unflexed. If the bimorph is bent and the thus created potential difference dissipated, such as by shorting or through a load, the unbending of the bimorph by external force or its own internal spring force will produce an electric potential of a polarity opposite to that of the original potential produced when the bimorph was first bent. This potential will resist the forces (e.g., internal spring force) tending to return the bimorph to its original configuration.

The drawings illustrate the operating principal of cameras incorporating a preferred embodiment of the present invention. Because cameras are well known, the present description will be directed in particular to elements forming part of, or cooperating more directly with, the present invention. Camera elements not specifically shown or described may take various forms well known to those skilled in the art.

Figure 1:
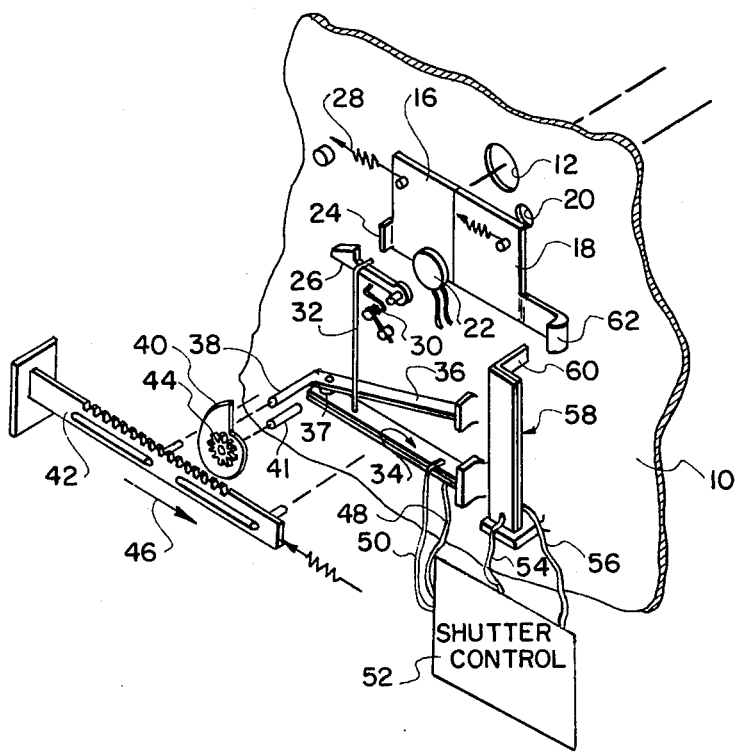
FIG. 1 is a perspective schematic view of a portion of a camera in accordance with a preferred embodiment of the present invention.

Referring to the drawings, and specifically to FIG. 1, a camera housing 10 has an aperture 12 for focusing an image to be photographed at the camera's film plane, not shown. Between the aperture and the film plane, a pair of shutter blades 16 and 18 are spring-urged to the left as shown. A second aperture 20 in housing 10 is aligned with a photoresponsive element 22 (FIG. 2) of exposure control electronics 52. Light, passing through aperture 20, is normally blocked from the photoresponsive element by shutter blade 16, but reaches the element when the blade moves to the left to initiate exposure as will be explained hereinafter.

Shutter blade 16 has a tab 24 which is engaged by a latch member 26 to hold the blade in an aperture closing position against the force of spring 28. Latch member 26 is held up by a spring 30 and is connected by a rod 32 to the free end of a cantilever-mounted bimorph generator 34 so that downward movement of the free end of the bimorph will unlatch tab 24.

A leaf spring 36 is also cantilever-mounted to housing 10 and carries a striker 37 at its free end. A rod 38, also at the free end of spring 36 extends into the path of a spiral cam 40 which is free to rotate on a pin 41 mounted on housing 10 when a rack 42, geared to the cam at pinion 44 is moved in the direction of arrow 46. Pinion 44 is ratcheted to cam 40 so that return motion of rack 42 does not rotate the cam.

Figure 2:
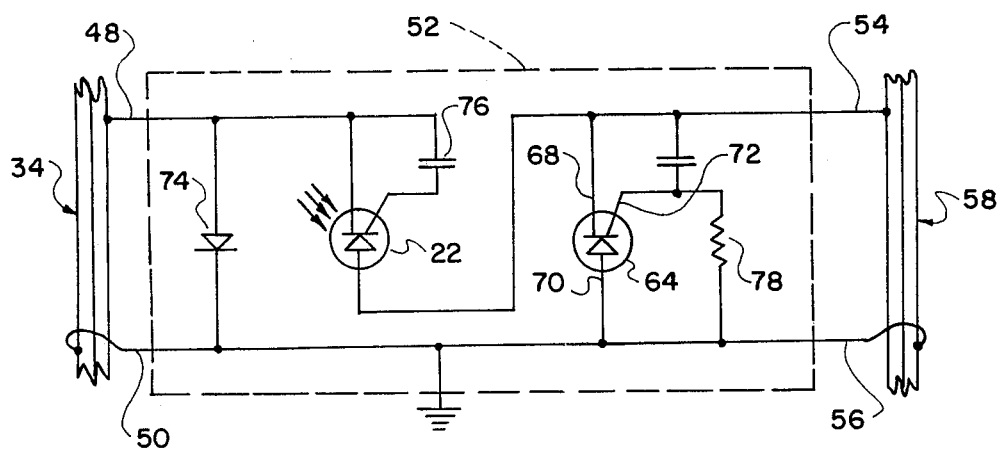
FIG. 2 is a diagram of the timing circuit for the camera of FIG. 1.

Bimorph generator 34 is electrically connected by leads 48 and 50 (one connected to each of the bimorph's two strips) to an electronic shutter control circuit 52 which will be more fully described with respect to FIG. 2. Also connected to the shutter control circuit, by leads 54 and 56, is a bimorph motor 58 fixed at its lower end to housing 10 and carrying a protrusion 60. Protrusion 60 normally engages a latch 62 to hold closing shutter blade 18 out of alignment with taking aperture 12. Latch 62 is necked down at its point of attachment to blade 18 so as to be quite flexible thereat.

Referring now to FIG. 2, shutter control circuit 56 is shown in a preferred form. The circuit includes a silicon controlled rectifier (SCR) 64 and a light activated silicon controlled rectifier (LASCR) 22, also known as a "Photo SCR". These are standard electronic components well known to those skilled in the art. However, if additional information is desired, the reader is referred to "Reference Data for Radio Engineers", H. W. Sams & Co., 6th, 1975, page 19-15 for a discussion of SCR's and to "General Electronic Optoelectronics Manual", W. H. Sahn, 1976, pages 5 to 7 for information on LASCR's.

In general, SCR 64 presents a very high resistance to current flowing from lead 68 (the cathode) to lead 70 (the anode). However, once a predetermined potential difference has been established between the cathode and the SCR's gate 72, the SCR triggers and current flows therethrough from cathode to anode.

LASCR 22 operates similarly except that the gate voltage of a LASCR will leak through that device to create a photocurrent which is a function of the light intensity falling upon the LASCR. It will be recalled that LASCR 22 is aligned with aperture 20, FIG. 1, of housing 10 and is shielded from light entering the aperture by opening shutter blade 16 when the blade is latched open by member 26. Assuming that the photocurrent is at a predetermined minimum value, the LASCR will trigger when the cathode-to-gate voltage reaches a threshold voltage.

Operation

Figure 3:
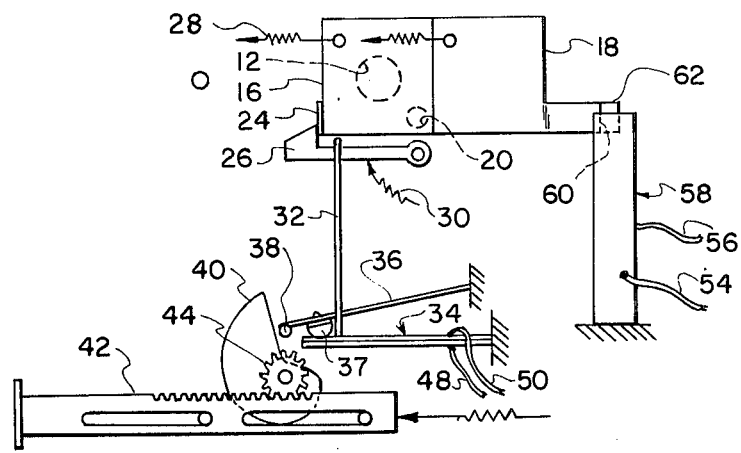
FIGS. 3–6 are successive views of the elements of the camera of FIG. 1 as they progress through an exposure cycle.
Figure 4:
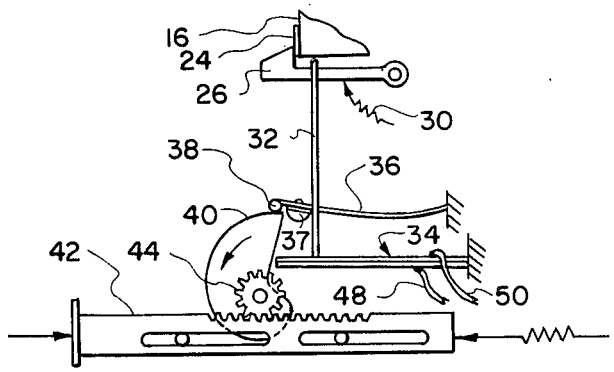

FIGS. 3-6 show the camera elements in their various positons during a complete exposure cycle. In FIG. 3, the camera shutter is shown cocked. To begin an exposure, the operator manually pushes rack 42 to the right to rotate pinion 44 and spiral cam 40. Follower rod 38 follows the cam surface to flex spring 36 as shown in FIG. 4. Continued rotation of cam 40 frees follower 38 to permit rapid unbending of spring 36 so that the striker carried by spring 36 impacts upon bimorph generator 34, bending the free end of the generator downwardly, thereby causing rod 32 to draw latch 36 away from tab 24 and release opening shutter blade 16 for movement to the left.

Figure 5:
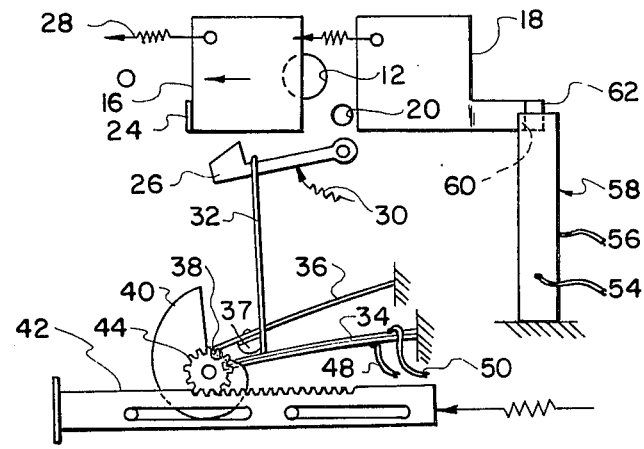

FIG. 5 shows the positions of the elements shortly after latch 26 has opened and before blade 16 has reached the end of its leftwardly travel. Spring 36 has propelled its striker member into bimorph generator 34, bending the bimorph to tend to generate an electrical potential difference between the bimorph's strips. That potential difference is of a sign which forward biases a diode 74 (FIG. 2) in shutter control circuit 52 so as to short out the charge across the bimorph.

Figure 6:
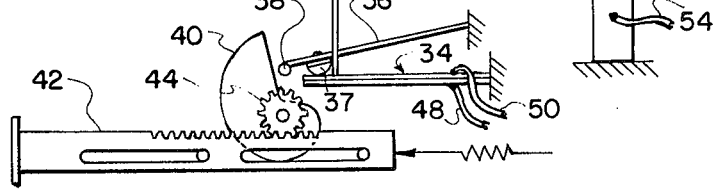

As spring 36 and bimorph generator return toward their FIG. 6 unflexed positions due to their internal spring force, a transient electrical charge builds up across the bimorph having a sign which reverse biases diode 74. That charge is presented at the cathode of LASCR 22. Since capacitor 76 is effectively a short for a transient signal, the gate and the cathode will initially be at substantially the same potential and the anode-cathode current through the LASCR will be minimal.

When the LASCR is exposed to light, a photocurrent I is initiated from the gate electrode. The photocurrent is a function of the light intensity falling upon the LASCR, and begins to charge capacitor 76 according to the equation:

$$dv/dt = I/c, \qquad (1)$$

where $c$ is the value of capacitor 76. Once the potential difference between the gate and the cathode (the voltage built up on capacitor 76) has reached the threshold value, the LASCR triggers, permitting current to pass. Accordingly, when the LASCR triggers, bimorph motor 58 will be rapidly charged. As will be explained, this rapid charging of bimorph 58 results in termination of the exposure interval. Therefore, the shutter speed is directly dependent upon the LASCR's photocurrent, which is in turn dependent upon the intensity of scene light.

Of course, LASCR 22 is only one of several suitable devices for delaying the transient signal. For instance, the LASCR may be replaced by an SCR and a photoconductive element for regulating the current through capacitor 76.

As mentioned above, exposure termination is controlled by bimorph 58. The rapidly charging motor bimorph 58 bends in the direction of latch 62 to flex the latch at its hinged region. Because its movement is fast, bimorph 58 will over flex and, at the end of its stroke, will rebound back toward its initial position. During the rebound movement away from latch 62, protrusion 60 becomes disengaged from the latch. The rate of return is enhanced by allowing the charge over the bimorph to be shorted through SCR 64 (FIG. 2). Upon receiving a transient signal from LASCR 22, the SCR's gate 72 and cathode 68 are substantially equally charged. A current is established through a resistor 78, to charge the capacitor according to equation (1). When there is a sufficient charge difference between gate 72 and cathode 68, so that the cathode-to-gate potential reaches the threshold voltage, SCR fires to short bimorph 58.

The rearwardly accelerating bimorph overcomes friction between protrusion 60 and latch 62 so that closing blade 18 is unlatched and moves to its FIG. 6 position to cover aperture 12; terminating exposure. Residual voltages leak off through SCR 64, resetting the circuit for the next actuation. The shutter blades may be reset by any convenient method such as that shown in U.S. Pat. No. 3,205,799 which issued Sept. 14, 1965 to J. P. Burgarella et al.

The invention has been described in detail with particular reference to a preferred embodiment thereof, but it will be understood that variations and modifications can be effected within the spirit and scope of the invention.

We claim:

1. In a camera of the type having an exposure aperture, a shutter movable between an aperture-opening position and an aperture-closing position, means for biasing said shutter toward an aperture-closing position, means operable after said shutter is moved to an aperture-opening position for latching said shutter in an aperture-opening position, said latching means being responsive to the application of electrical energy for unlatching said shutter to allow said shutter to move from an aperture-opening toward an aperture-closing position, and means operatively coupled to said latching means for generating electrical energy, the improvement wherein said generating means comprises a piezoelectric generator, and wherein said latching means comprises a piezoelectric motor.

2. The apparatus defined by claim 1 wherein said piezoelectric generator is a bimorph.

3. The apparatus defined by claim 1 wherein said piezoelectric motor is a bimorph.

4. The apparatus defined by claim 1 wherein said latching means further comprises an electronic circuit for applying a transient electrical signal to said piezoelectric motor after an exposure period which varies as a function of scene luminance.

5. The apparatus defined by claim 4 wherein said electronic circuit comprises an electrical energy storage device and a light-sensitive gate for controlling the application of stored electrical energy to said piezoelectric motor.

6. The apparatus defined by claim 4 wherein said light-sensitive gate comprises a light-activated silicon controlled rectifier.

7. A camera comprising a movable shutter for selectively blocking and unblocking an exposure aperture, biasing means for urging said shutter toward an aperture blocking position, releasable latch means for holding the shutter in an unblocking position against the urging of said biasing means, said latch means comprising a piezoelectric motor which is adapted to change shape in response to having a transient electrical signal applied thereto and thereby release said shutter, and electronic circuit means for producing a transient electrical signal after an exposure period which varies as a function of the level of scene luminance.

8. The apparatus defined by claim 7 wherein said piezoelectric motor means comprises a bimorph.

9. The apparatus defined by claim 7 wherein said electronic circuit means comprises a piezoelectric generator.

10. The apparatus defined by claim 9 wherein said piezoelectric generator comprises a bimorph.

* * * * *